(12) United States Patent
Hartmann et al.

(10) Patent No.: US 8,244,036 B2
(45) Date of Patent: Aug. 14, 2012

(54) METHOD FOR EMPHASIZING DIFFERENCES IN GRAPHICAL APPEARANCE BETWEEN AN ORIGINAL DOCUMENT AND A MODIFIED DOCUMENT WITH ANNOTATIONS

(75) Inventors: Brian Hartmann, Simi Valley, CA (US); Benjamin Gunderson, Simi Valley, CA (US)

(73) Assignee: Bluebeam Software, Inc.

( * ) Notice: Subject to any disclaimer, the term of this patent is extended or adjusted under 35 U.S.C. 154(b) by 1244 days.

(21) Appl. No.: 11/626,631

(22) Filed: Jan. 24, 2007

(65) Prior Publication Data

US 2008/0175484 A1 Jul. 24, 2008

(51) Int. Cl.
*G06K 9/34* (2006.01)
*G06K 9/64* (2006.01)
*G06K 9/32* (2006.01)
*G06F 17/00* (2006.01)

(52) U.S. Cl. ........ 382/179; 382/219; 382/294; 715/232; 715/231; 715/268

(58) Field of Classification Search .......... 382/195, 382/219, 179, 294; 715/232, 231, 268
See application file for complete search history.

(56) References Cited

U.S. PATENT DOCUMENTS

| | | | | |
|---|---|---|---|---|
| 5,048,099 | A * | 9/1991 | Lee | 382/175 |
| 5,142,619 | A | 8/1992 | Webster, III | |
| 5,835,634 | A * | 11/1998 | Abrams | 382/222 |
| 6,041,335 | A | 3/2000 | Merritt et al. | |
| 6,324,555 | B1 | 11/2001 | Sites | |
| 6,573,893 | B1 | 6/2003 | Naqvi et al. | |
| 6,591,010 | B1 | 7/2003 | Russin | |
| 7,092,571 | B2 | 8/2006 | Hsieh | |
| 2004/0034832 | A1 | 2/2004 | Taylor et al. | |
| 2004/0049734 | A1 | 3/2004 | Simske | |
| 2004/0205482 | A1 | 10/2004 | Basu et al. | |
| 2005/0262430 | A1 | 11/2005 | Croft | |
| 2006/0067571 | A1* | 3/2006 | Onishi | 382/149 |
| 2006/0291727 | A1* | 12/2006 | Bargeron | 382/218 |

OTHER PUBLICATIONS

Meinl, Wolfgang, Supplementary European Search Report, pp. 1-4, Jun. 6, 2012.

* cited by examiner

*Primary Examiner* — Kathleen Y Dulaney
(74) *Attorney, Agent, or Firm* — Stetina Brunda Garred & Brucker

(57) ABSTRACT

A method for emphasizing differences in graphical appearances between an original document and a modified document is provided in accordance with an aspect of the present invention. The method includes the step of receiving a first bitmap of the modified document, and a second bitmap of the original document. The method includes deriving a set of difference points based upon a comparison of the first bitmap and the second bitmap. The method includes a step of superposing a spatial index onto the set of difference points, and generating polygon vertices from a plurality of adjacent elements of index. Each of the elements has a predetermined density of difference points. The method concludes with generating an annotation from the polygon vertices.

17 Claims, 14 Drawing Sheets

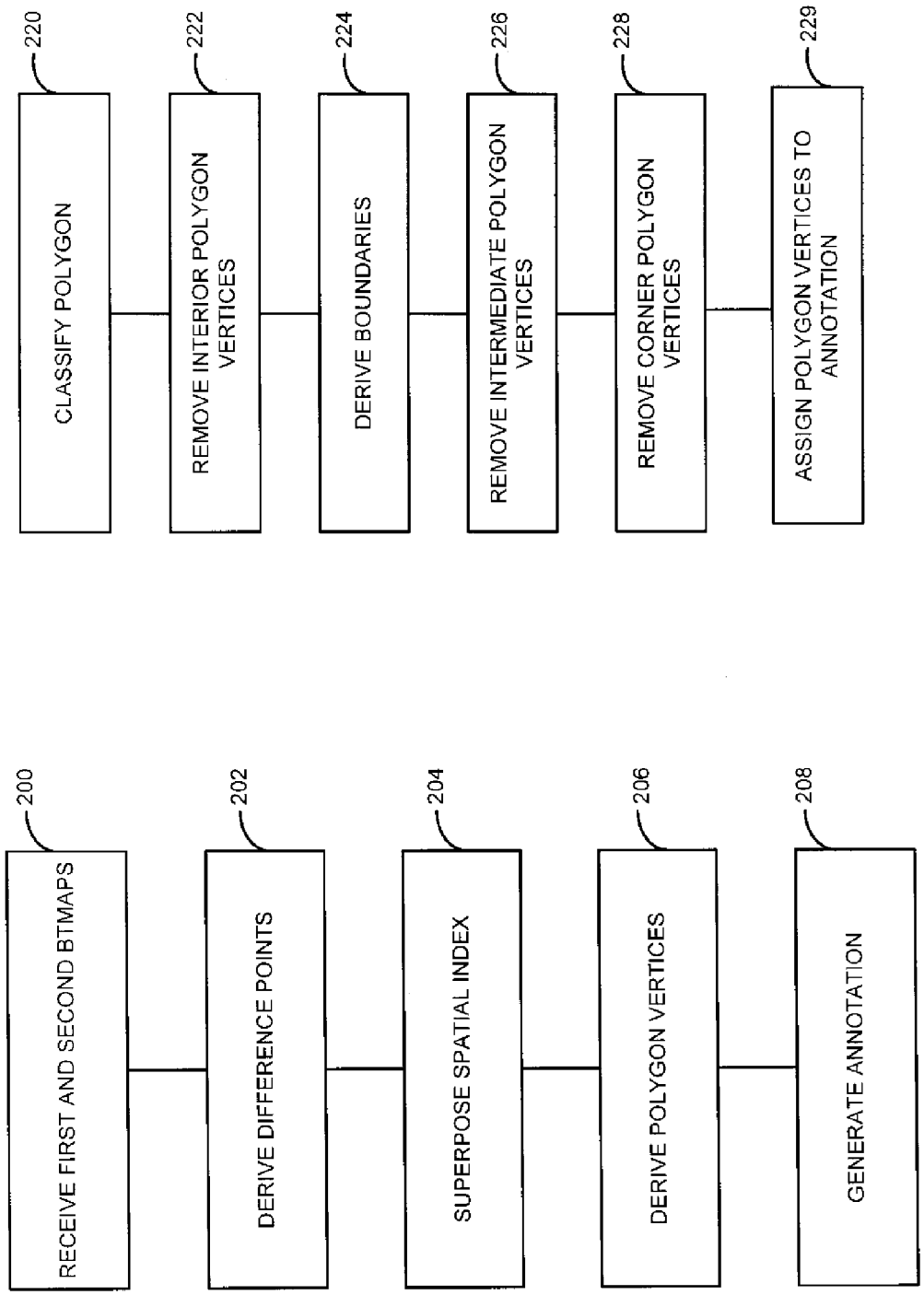

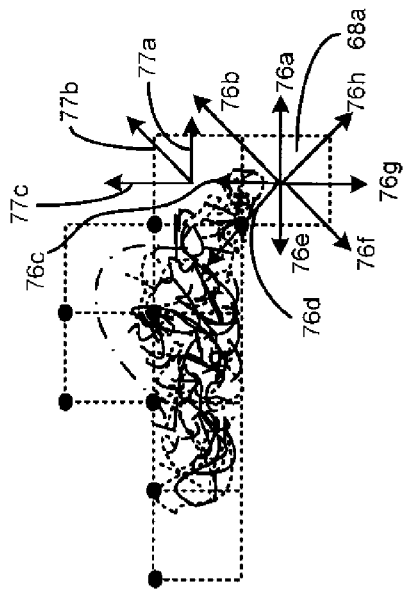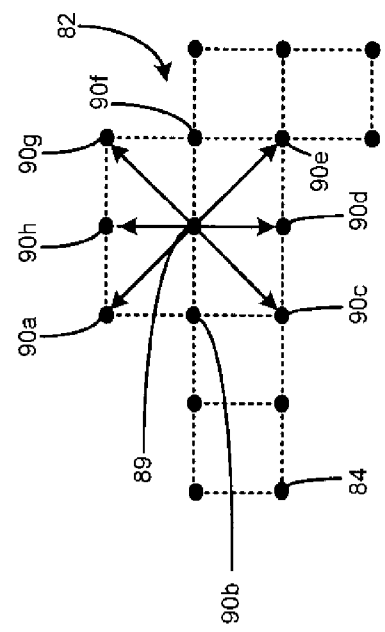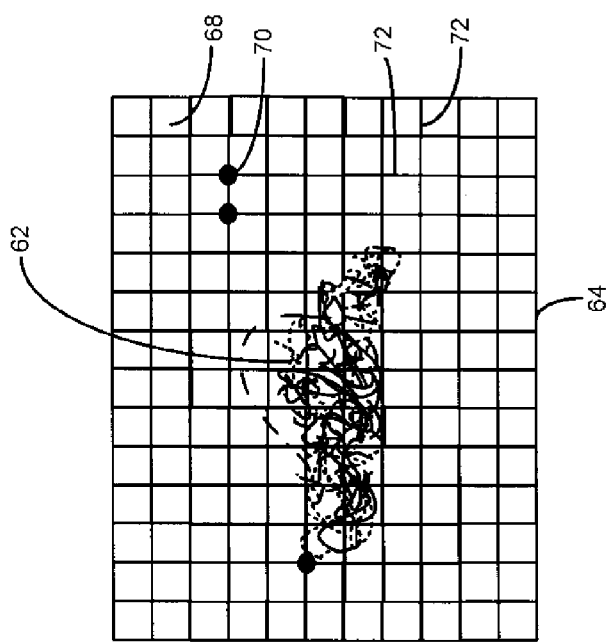

METHOD FOR EMPHASIZING DIFFERENCES IN GRAPHICAL APPEARANCE BETWEEN AN ORIGINAL DOCUMENT AND A MODIFIED DOCUMENT WITH ANNOTATIONS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to methods for electronic document revision tracking and control. More particularly, the present invention relates to methods for emphasizing differences in graphical appearance between an original document and a modified document with attached annotations.

2. Related Art

Advancements in high speed data communications and computing capabilities have increased the use of remote collaboration for conducting business. While real-time collaboration using videoconferencing and the like are gaining in popularity, the vast majority of collaboration occurs over e-mail in the exchange of documents incorporating incremental modifications, comments, and the like. A local user may create an initial version of a document, and transmit the same to remotely located colleagues. These remote users may then make their own changes or add comments in the form of annotations appended to the document, and then transmit the new version back to the local user.

Such collaboration may involve the exchange of documents generated with word processing applications, desktop publishing applications, illustration/graphical image manipulation applications, Computer Aided Design (CAD) applications, and so forth. As utilized herein, the term "document" may refer to data produced by any of the aforementioned software applications. Furthermore, the term "content" may refer to data particular to the software application that generated it and stored in the document of the same. Due to the existence of many different computing platforms having a wide variety of operating systems, application programs, and processing and graphic display capabilities, however, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Currently, PDF is utilized to encode a wide variety of document types, including those composed largely of text, and those composed largely of vector and raster graphics. Due to its versatility and universality, files in the PDF format are often preferred over more particularized file formats of specific applications. As such, documents are frequently converted to the PDF format.

The exchange of documents according to the workflow described above may take place numerous times, with the content of the document evolving over time. For example, in various engineering projects utilizing CAD drawings, such as in architecture or product design, a first revision of the document may include only a basic outline or schematic. Subsequent revisions may be generated for review and approval as further features or details are added prior to construction or production. On a more extended timeline, multiple iterations of designs may be produced. In another example, an author or a graphics designer may produce an initial draft of a document, with editors and reviewers adding comments or otherwise marking the document and resubmitting it to the author or graphics designer. The changes are incorporated into a subsequent version. While in some instances the review and approval process is performed directly on the electronic document, there are many instances where a printed hard copy of the document is utilized. As such, the reviewer may annotate, comment upon, or edit the document directly on the hard copy thereof.

As mentioned briefly above, annotations may be added to a document for commenting on changes or suggesting changes. The annotations are separate objects overlaid on the content, and may take a variety of forms such as text, geometric shapes, and the like. Additional information typically accompanies the annotations, such as the date that it was added to the document, the user who added it, the visual style of the annotation, etc. CAD applications such as AutoCAD from AutoDesk of San Rafael, Calif., as well as other graphics-oriented applications such as those for handling PDF documents, include the aforementioned annotation features. One benefit of placing annotations on the document is that comments and suggested changes may be easily tracked from a tabular interface such as that provided by the Revu application from Bluebeam Software, Inc, of Pasadena, Calif.

During collaboration, it is often desirable to review earlier versions of a document and compare the same to a current version. By doing so, the evolution of the content may be better appreciated, and each change made to the content may be tracked for approval and other purposes. As such, there is a need for software tools that can rapidly and automatically identify differences between two documents. For example, where the document includes hundreds of pages but a change is made in only one or two sentences therein, it is difficult to manually search for the change within the large volume of text. Further, where an engineering drawing contains numerous details, but where only a single dimension is changed, manually identifying it is very time-consuming. Indeed, such minor changes may have been ignored completely by a reviewer, resulting in delays, production defects, and the like.

A number of document comparison techniques are known in the art. WORD from Microsoft Corp. of Redmond, Wash., includes a "track changes" function that allows multiple users to review, insert comments, edit, and supplement the content generated by the originator. Anything added or removed by subsequent users are highlighted with different colors, underlined, the text rendered with strikethroughs, and otherwise emphasize the difference within the document. As with the textual content comparison system of Word, graphical content comparison systems apply highlights and other emphases directly onto the content, or change certain attributes of the content. Therefore, the integrity of the content is affected. Furthermore, discerning one difference from another is difficult, particularly where there are a large number of differences. In the alternative, a separate listing or report of differences is generated, or the highlighting the differences directly on an output screen. Prior techniques frequently misidentified differences, and are thus deficient. For example, where a border is added but the content is not modified, the entire area of the border is identified as a difference along with the unchanged content, rendering the comparison process ineffective.

Accordingly, there is a need in the art for an improved method for highlighting graphical appearance differences between an original document and a modified document. More particularly, there is a need in the art for comparing the original document to the modified document and deriving annotations for appending thereto, such that the changes are quickly and easily identified.

BRIEF SUMMARY

In accordance with one aspect of the present invention, there is disclosed a method for emphasizing differences in graphical appearances between an original document and a modified document with attached graphic objects. In this regard, the integrity of the original content layer is not affected. Furthermore, a readily accessible visual representation of the difference is provided. The method may commence with receiving a first bitmap of the modified document, and a second bitmap of the original document. Thereafter, the method may continue with deriving a set of difference points based upon a comparison of the first bitmap and the second bitmap. The difference points may be representative of coordinates within the first and second bitmaps with pixel value differences that exceed a predetermined threshold. The method may also include a step of superposing a spatial index onto the set of difference points. The spatial index may be defined by contiguously spaced cells bound by cell vertices. Additionally, the method may include a step of generating polygon vertices from the cell vertices of a plurality of adjacent cells. Each of the adjacent cells may have a predetermined density of a subset of the difference points. The method may conclude with generating from the polygon vertices an annotation defined by annotation vertices.

The annotations may be tracked in a list or catalogue, and do not affect the underlying content. Additionally, such a list can be sorted, filtered and linked with a visual display, with the capability of changing its status, posting comments and replies to the annotations, and so forth. The annotations may also be stored, summarized, and exported, substantially improving collaboration.

In accordance with another aspect of the present invention, the method for emphasizing differences in graphical appearances between an original document and a modified document may include a step of deriving an outer boundary from a first subset of the polygon vertices. Additionally in such a method may include the step of assigning the polygon vertices that define the outer boundary to the annotation vertices. After generating the polygon vertices, the method may include removing interior polygon vertices that are located within the outer boundary and surrounded by neighboring polygon vertices.

The step of deriving an outer boundary may include sequentially storing in an outer trace list each of the first subset of the polygon vertices around the outer boundary. This may begin with an outer starting point, and continue in a first generally rotational direction. The polygon vertices in the outer trace list may be associated with a first portion of the annotation vertices. After deriving the outer boundary, the method may include removing each of the polygon vertices lying within a single contiguous line segment. Additionally, the method may include removing central vertices of polygon corners.

According to yet another aspect of the present invention, a method for emphasizing differences in graphical appearances between an original document and a modified document may include a step of deriving an inner boundary. The inner boundary may be derived from one or more groups of a second subset of the polygon vertices. Thereafter, the polygon vertices that define the one or more inner boundaries may be assigned to the annotation vertices. After generating the polygon vertices, the method may include removing interior polygon vertices. The interior polygon vertices may be located within the outer boundary and the inner boundary and surrounded by neighboring polygon vertices.

In another aspect of the present invention, the step of deriving the inner boundary may include sequentially storing a first one of the groups of the second subset of the polygon vertices in an inner trace list around a first one of the inner boundaries. This step may begin from a first inner starting point, and proceed in a second generally rotational direction. Upon completion, the polygon vertices in the inner trace list may become associated with a second portion of the annotation vertices. Furthermore, the method may include sequentially storing a second one of the groups of the second subset of the polygon vertices in the inner trace list. The retrieval of the polygon vertices may proceed in the second generally rotation direction beginning with a second inner starting point. Upon storing the polygon vertices in the inner trace list, the method may continue with removing each of the polygon vertices lying within a single contiguous line segment. Additionally, the method may include removing central vertices of polygon corners.

According to another aspect of the present invention, the pixel value differences may be related to red, green, and blue luminance values. The difference points may be representative of coordinates within the first and second bitmaps with neighboring pixel value differences that exceed a predetermined threshold. Prior to receiving the first bitmap and the second bitmap, the modified document may be converted to the first bitmap and the original document may be converted to the second bitmap.

Various modalities of presenting the annotated document to the user is within the scope of the present invention. According to one aspect, the annotation may be overlaid on the modified document, which is displayed in a graphical user interface. Alternatively, the method may include overlaying the annotation on the modified document, with the modified document and the original document being displayed simultaneously in a graphical user interface.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5a is a flowchart describing a method of emphasizing differences between the original document and the modified document with attached graphic objects in accordance with an aspect of the present invention;

FIG. 5b is a method for generating annotations after differences between documents have been identified in accordance with another aspect of the present invention;

FIG. 9 is a visualization of the difference points with a grid superposed thereon in accordance with an aspect of the present invention;

FIG. 10 is a visualization of the difference points with a grid after certain cells have been removed for lacking a sufficient density of difference points thereunder;

FIG. 11 is a first exemplary polygon defined by cell vertices extracted from the grid;

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

Figure 1:
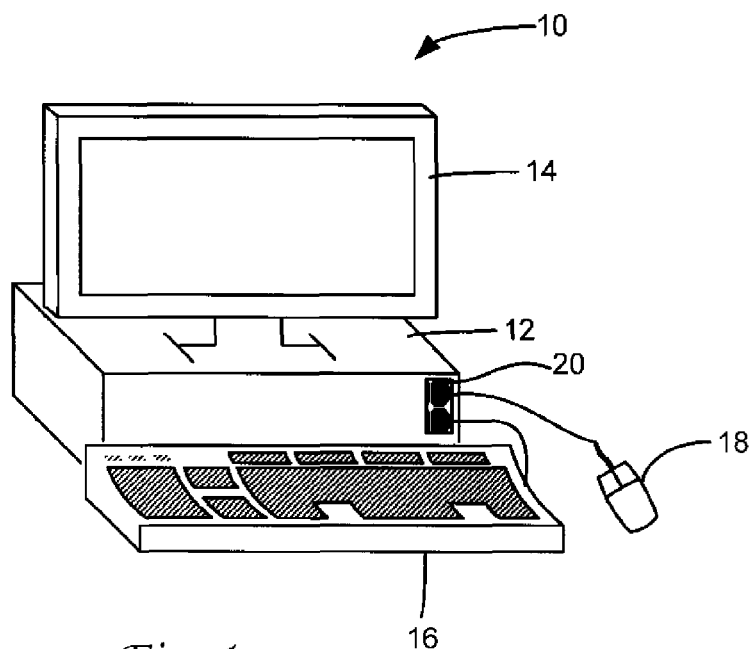
FIG. 1 is a perspective view of a computer system that may be used to implement aspects of the present invention, including a system unit, a display unit, and various other input devices.

With reference to FIG. 1, an exemplary hardware environment in which aspects of the present invention may be implemented includes a computer system 10 with a system unit 12 and a display unit 14. The display unit 14 graphically displays output from the data processing operations performed by the system unit 12, and may be of a Liquid Crystal Display (LCD) type, a Cathode Ray Tube (CRT) type, or any other suitable type of display. Devices such as a keyboard 16 and a mouse 18 provide input to the data processing operations, and are connected to the system unit 10 via a USB port 20. Various other input and output devices may be connected to the system unit 12, and alternative interconnection modalities may be substituted with the USB port 20.

Figure 2:
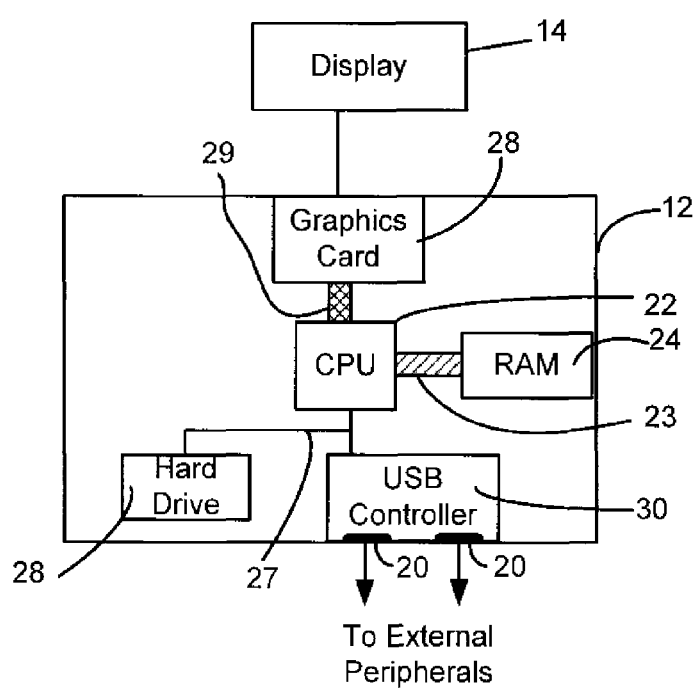
FIG. 2 is a block diagram of the components of the system unit in the computer system illustrated in FIG. 1.

As shown in the block diagram of FIG. 2, the system unit 12 includes a Central Processing Unit (CPU) 22, which may represent one or more conventional types of such processors, such as an IBM PowerPC, Intel Pentium (x86) processors, and so forth. A Random Access Memory (RAM) 24 temporarily stores results of the data processing operations performed by the CPU 22, and is interconnected thereto typically via a dedicated memory channel 23. The system unit 10 may also include permanent storage devices such as a hard drive 26, which are also in communication with the CPU 22 over an i/o bus 27. Other types of storage devices such as tape drives, Compact Disc drives, and the like may also be connected. A graphics card 28 is also connected to the CPU 22 via a video bus 29, and transmits signals representative of display data to the display 14. As indicated above, the keyboard 16 and the mouse 18 are connected to the system unit 12 over the USB port 20. A USB controller 30 translates data and instructions to and from the CPU 22 for external peripherals connected to the USB port 20. Additional devices such as printers, scanners, microphones, speakers, and the like may be connected to the system unit 12.

The system unit 12 may utilize any operating system having a graphical user interface (GUI), such as WINDOWS from Microsoft Corporation of Redmond, Wash., MACOS from Apple, Inc. of Cupertino, Calif., various versions of UNIX with the X-Windows windowing system, and so forth. The system unit 12 executes one or more computer programs, with the results thereof being displayed on the display unit 14. Generally, the operating system and the computer programs are tangibly embodied in a computer-readable medium, e.g. one or more of the fixed and/or removable data storage devices including the hard drive 26. Both the operating system and the computer programs may be loaded from the aforementioned data storage devices into the RAM 24 for execution by the CPU 22. The computer programs comprise instructions which, when read and executed by the CPU 22, cause the same to perform the steps necessary to execute the steps or features of the present invention.

The foregoing computer system 10 represents only one exemplary apparatus suitable for implementing aspects of the present invention. As such, the computer system 10 may have many different configurations and architectures. Any such configuration or architecture may be readily substituted without departing from the scope of the present invention.

Figure 4:
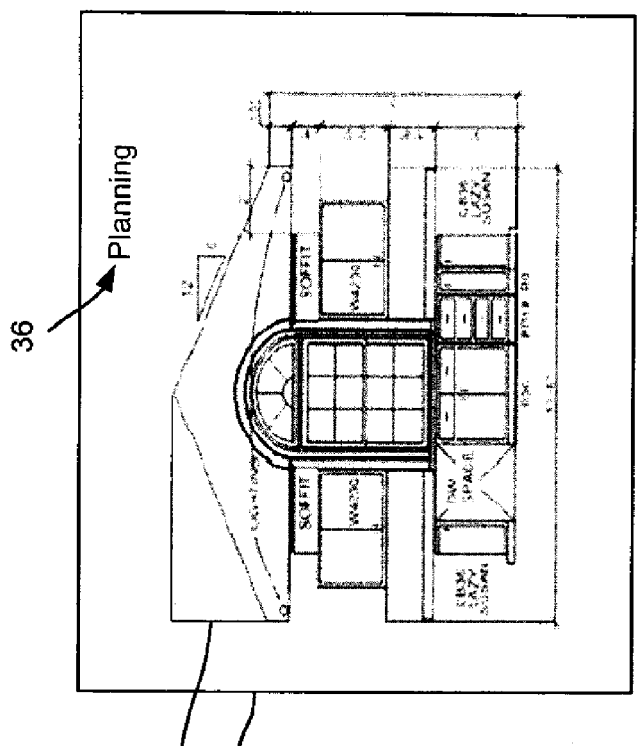
FIG. 4 is an example of a modified document with certain text and graphic elements being different as compared to the original document.
Figure 3:
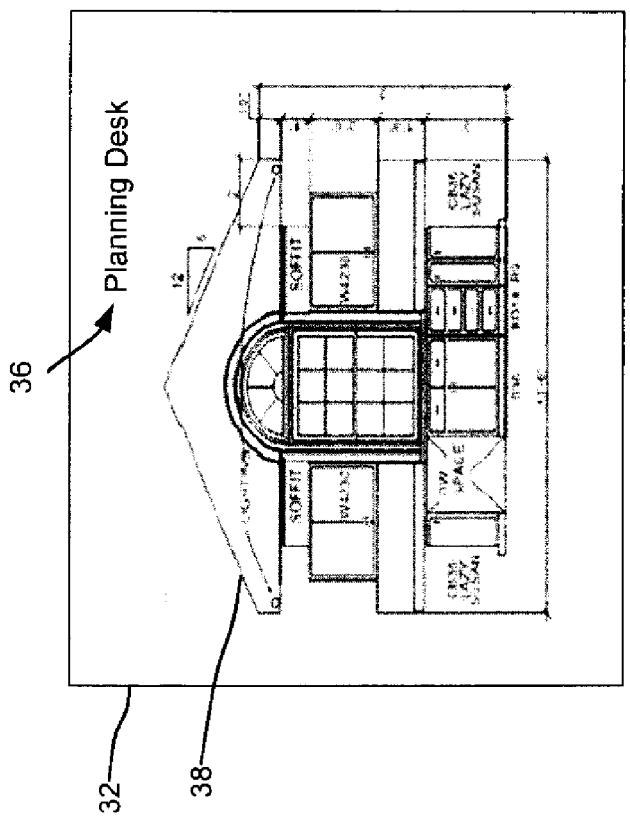
FIG. 3 is an example of an original document including various text and graphic elements.

With reference to FIGS. 3 and 4, an aspect of the present invention relates to a method for emphasizing differences in graphical appearances between an original document 32 and a modified document 34. In one embodiment, both the original document 32 and the modified document 34 are stored as a Portable Document Format (PDF) file, which, as described above, include text, vector graphics, and raster (bitmap) graphics. By way of example, a heading 36 of the original document 32 is "Planning Desk," and includes an illustration of a house with a slanted left roofline 38. In comparison, the heading 36 of the modified document 34 is "Planning". Furthermore, the roofline 38 has been changed altered. It is understood that the foregoing graphical elements of the original document 32 and the modified document 34 are presented for exemplary purposes only. According to an aspect of the present invention, each of the aforementioned differences is highlighted for rapidly identifying the same.

Figure 6:
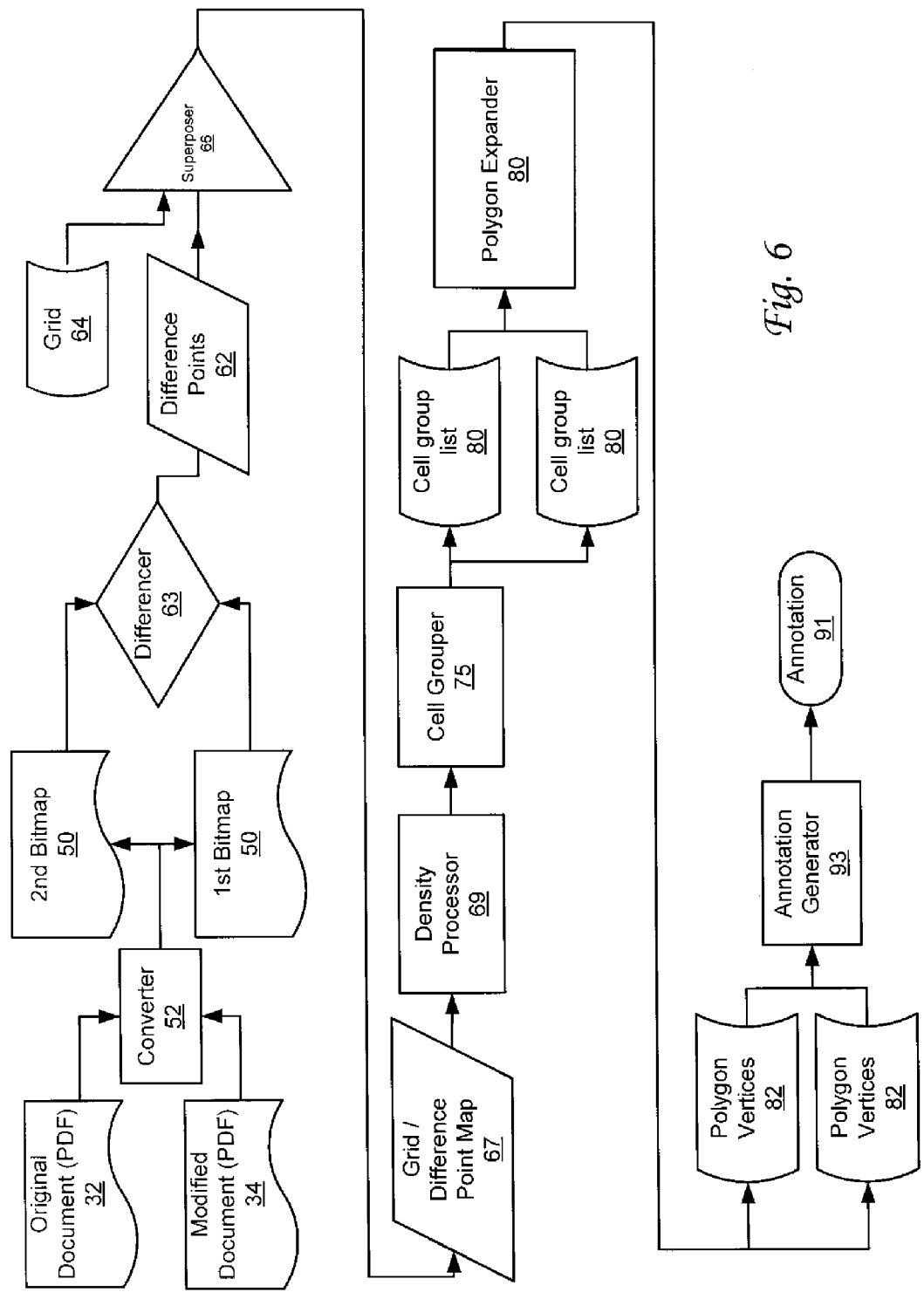
FIG. 6 is a block diagram illustrating the various data files and functional blocks for implementing the method of emphasizing differences between the original document and the modified document.

With reference to the flowchart of FIG. 5a and the block diagram of FIG. 6, the method includes a step 200 of receiving a first bitmap 48 of the modified document 34, and a second bitmap 50 of the original document 32. As described above, according to one embodiment, the original document 32 and the modified document 34 are PDF files, with the contents thereof being stored as discrete objects of text and geometric primitives. Accordingly, the original document 32 is converted to the second bitmap 50 and the modified document 34 is converted to the first bitmap 48 by a converter 52. It is contemplated that the original document 32 and the modified document 34 exist as bitmap files, in which case the aforementioned conversion is skipped.

Figure 7:
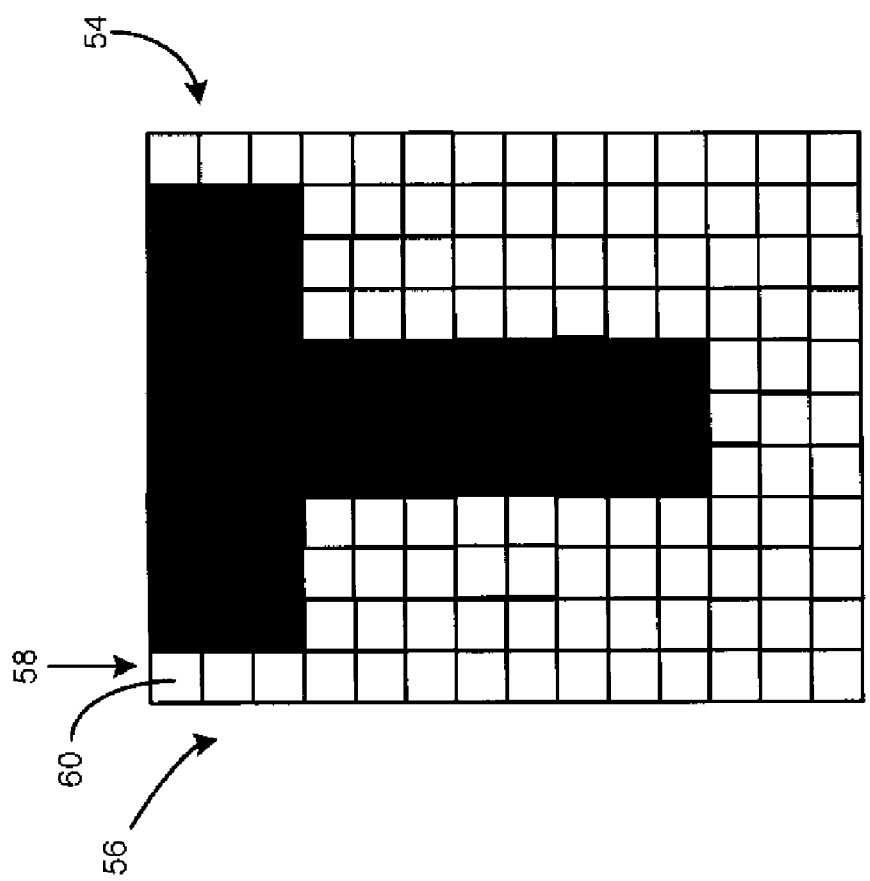
FIG. 7 is a view of an exemplary bitmap with sample content, magnified to the extend of visualizing individual pixels.

Referring to a magnified area of the original document 32 as shown in FIG. 7, an exemplary bitmap 54 is comprised of rows 56 and columns 58 of pixels 60. The pixels 60 are arranged to define the letter "T" in the exemplary bitmap 54. Each of the pixels 60 represents one point in the image, and is particularly referenced by a set of coordinates identifying a particular one of the rows 56 and a particular one of the columns 58. Further, each of the pixels 60 has associated therewith a set of three luminance values. A first luminance value represents the intensity of the red color, a second luminance value represents the intensity of the green color, and a third luminance value represents the intensity of the blue color. The intensity is represented as a numerical value, typically between 0 and 255 for an 8-bit color depth. By combining varying intensities of the red, green, and blue colors, any color may be represented. Along these lines, the resolution of the bitmap may be varied according to the number of pixels per inch.

In order to account for minor inconsistencies in the bitmaps, a number of adjustments are made thereto. More particularly, the scale of the bitmap may be adjusted based upon a specified Dots Per Inch (DPI)/Points Per Inch (PPI) setting. Additionally, the offset may be adjusted based on a specified offset value. Further preparations for comparing the bitmaps include overwriting the edges of the bitmap based upon a margin setting. A copy of the respective one of the bitmaps of the original document 32 and the modified document 34 may be stored as a temporary file on the hard drive 26 or the RAM 24. For faster access, the bitmaps are locked into the RAM 24.

According to a step 202, the method continues with deriving a set of difference points 62 based upon a comparison of the first bitmap 48 and the second bitmap 50 by a differencer 63. The difference points 62 are representative of pixels within the first and second bitmaps 48, 50 having pixel value differences exceeding a predetermined threshold. More particularly, the red, green, and blue luminance values are compared for each pixel in the first and second bitmaps 48, 50. If the maximum difference amongst the red, green, and blue components is greater than a predetermined color sensitivity setting, the coordinates for the particular pixel is retained as one of the difference points 62.

In accordance with another aspect of the present invention, the difference points 62 are also representative of coordinates within the first and second bitmaps 48, 50 with neighboring pixel value differences exceeding a predetermined threshold. In other words, where a difference in one pixel is identified, each of the neighboring pixels is compared with the corresponding one of the pixels in the other bitmap. Again, if the maximum difference amongst the red, green, and blue components in that neighboring pixel is greater than the predetermined color sensitivity setting, the coordinates of the initial pixel is retained as one of the difference points 62. The extent to which neighboring pixels are recursively examined in this manner is determined by a proximity setting. In this regard, documents with high noise/error content may be processed differently to avoid false positives as compared to documents with low noise/error content.

Figure 8:
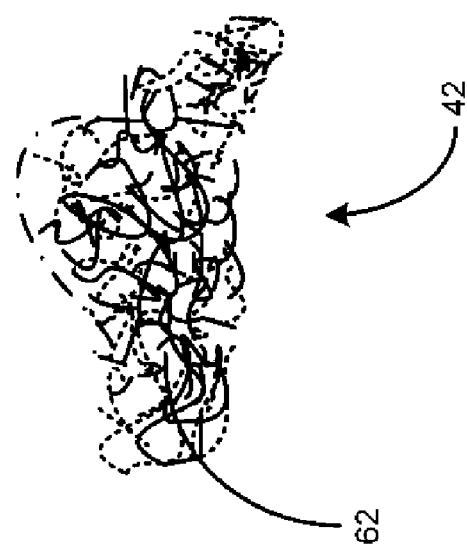
FIG. 8 is a visualization of difference points between the original document and the modified document.

Continuing with the example presented in the original and modified documents 32, 34 of FIGS. 3 and 4, FIG. 8 is a visual representation of the difference points 62 derived in accordance with step 202 and as described above. Referring to FIGS. 5a and 9, the method in accordance with an aspect of the present invention includes a step 204 of superposing a spatial index or grid 64 on to the set of difference points 62. As shown in the block diagram of FIG. 6, a superposer 66 receives input in the form of difference points 62 and the grid 64, and generates a combined grid/difference point plot 67. A visual representation of the plot 67 is shown in FIG. 9, though only one group of difference points 62 with the grid 64 overlaid thereon is illustrated. It is to be understood, however, that the grid 64 covers the entire field of the first or second bitmap 48, 50. The grid 64 is defined by contiguously spaced cells 68 bound by cell vertices 70 that are intersection points of gridlines 72. The size of the cells 68 in relation to the first and second bitmaps 48, 50 is user-defined, though a default value may be assigned. As will be explained further below, the size of the cells 68, or the distribution of the gridlines 72, affects the resolution and degree of accuracy in identifying differences.

After superposing the grid 64 on to the difference points 62, a step 206 of deriving polygon vertices from the cell vertices 70 follows. The cell vertices 70 of a plurality of adjacent cells 68 are utilized, with each having a predetermined density of a subset of the difference points 62 disposed within such cells 68. In further detail, the density of difference points 62 in each of the cells 68 is determined by a density processor 69, and those cells 68 having a predetermined threshold density are retained. Essentially, a histogram of the difference points 62 segregated into the cells 68 of the grid 64 is generated. Where a given one of the cells 68 does not have a sufficient density of difference points 62 but has at least one difference point 62 within that cell, the density of difference points 62 in each of the neighboring cells 68 are determined. If the neighboring cells 68 have a sufficient density, then the one of the cells having at least one difference point but insufficient density of difference points 62 is retained. In this regard, the cells 68 containing noise are removed, while the cells 68 containing the periphery of legitimate clusters of difference points 62 are retained. One of the advantages of processing areas of the bitmap as bounded by the cells 68, as opposed to processing the individual difference points 62, is that processing efficiency is greatly enhanced. As will be appreciated, only a couple hundred cells 68 need be processed, rather than tens of thousands of individual difference points. Thus, the size of the cells 68 should be maximized for decreasing the number to be processed, but not to the extent of affecting the accuracy in which the corresponding annotation covers the differences. As each page in a document may dictate a different cell size, according to an aspect of the present invention, the cell size may be modified before processing.

With reference to FIG. 10, a visual representation of the active grid list 74 is shown. Along these lines, there may be more than one group of cells 68 that have been retained, but with each group being located apart from another. As such, the step 206 is also understood to encompass the process of grouping adjacent cells 68 in the active grid list 74. Generally, a cell grouper 75 performs this process with an input of the active grid list 74, and outputs cell group lists 78. This process involves a function that recursively searches adjacent cells 68 to determine whether it has been retained. By way of example beginning with a first cell 68, a first iteration 76 sequentially examines an east direction 76a, a northeast direction 76b, a north direction 76c, a northwest direction 76d, a west direction 76e, a southwest direction 76f, a south direction 76g, and a southeast direction 76h. Upon determining that the cell 68 in the upward direction 76c has a sufficient density of the difference points 62, without continuing to the upper leftward direction 76f, a second iteration 77 is initiated with the examination of an east direction 77a, continuing on to a northeast direction 77b, a north direction 77c, and so forth. Whenever a particular cell has been determined to be associated with a group, it is recorded in one of the cell group lists 78. Although the cell group lists 78 have been mentioned in the plural, it is understood that the data contained therein be stored in a single list segregated into multiple groups.

The step of generating polygon vertices continues with a polygon expander 80 calculating the coordinates of the cell vertices 70 corresponding to the four corners of each of the cells 68 in the cell group lists 78. With reference to FIG. 11, the particular cell vertices 70 that define a first exemplary polygon 82 are also referred to as polygon vertices 84.

Figure 12:
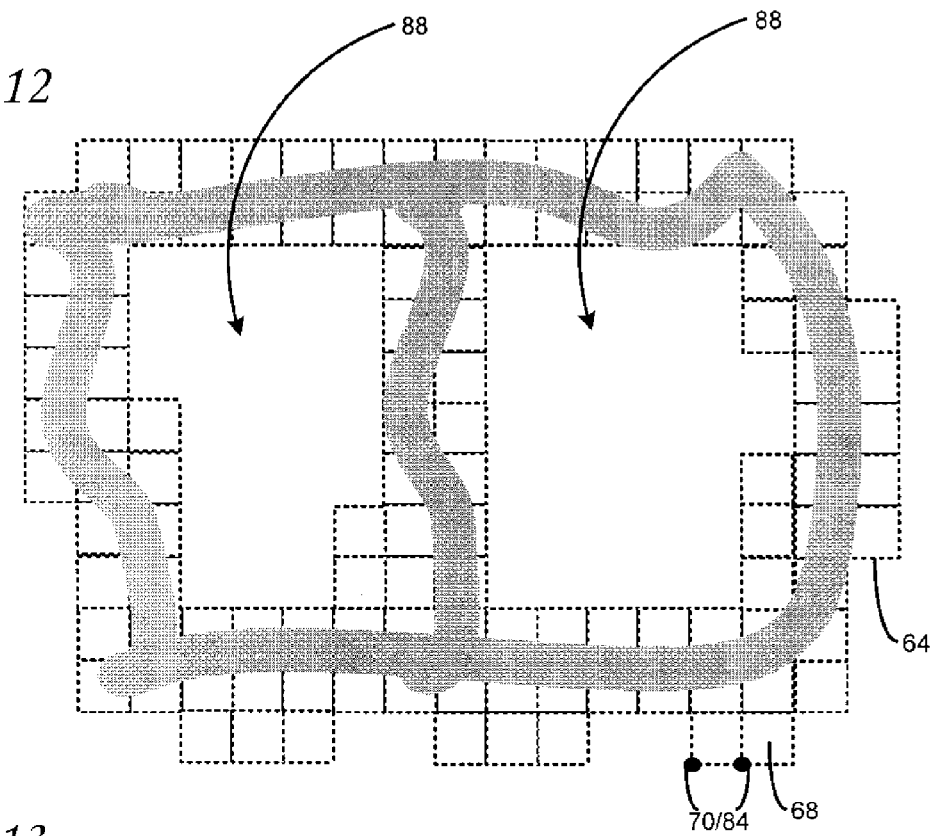
FIG. 12 is a visualization of difference points resulting in a second exemplary polygon including a cavity, with a grid superposed thereon.

Referring again to the flowchart of FIG. 5a and the block diagram of FIG. 6, the method in accordance with an aspect of the present invention concludes with a step 208 of generating an annotation 91 from the polygon vertices 84 with an annotation generator 93. The step 208 typically involves additional processing of the polygon vertices 84, however. Generally, as shown in FIGS. 10 and 11, the first exemplary polygon 82 may be categorized as having a solid interior, that is, each of the cells 68 within the bounds of the cell vertices 70 has a sufficient density of the difference points 62. In the alternative, as shown in FIG. 12, a second exemplary polygon 86 may be categorized as having a hollow interior or cavity 88, in which the cells 68 originally superposed on those regions of the cavity 88 have not been retained according to the processes described above because of an insufficiency in density of the difference points 62 therein. This is most common where a border has been added between the compared documents, but where content within such border has not been modified.

Referring to the flowchart of FIG. 5b, as a preliminary step 220, the polygon is classified as having a solid interior or a hollow interior. According to one embodiment, a flag may be set for later processing based upon a density determination made with respect to the polygon vertices. The number of possible cell vertices for a given rectangular region is compared against the number of actual cell vertices in that same rectangular region. By way of example only and not of limitation, if the ratio is more than 60%, it is deemed to have a hollow interior, and the flag is set. Any other suitable ratio may be substituted without departing from the scope of the present invention. As an example of the step 220, with reference to FIG. 11 and the first exemplary polygon 82 therein, there are fifteen actual cell vertices 84, and would be a total of twenty if none had been removed. The ratio is 75%, so it is not flagged because it has a solid interior.

Figure 13:
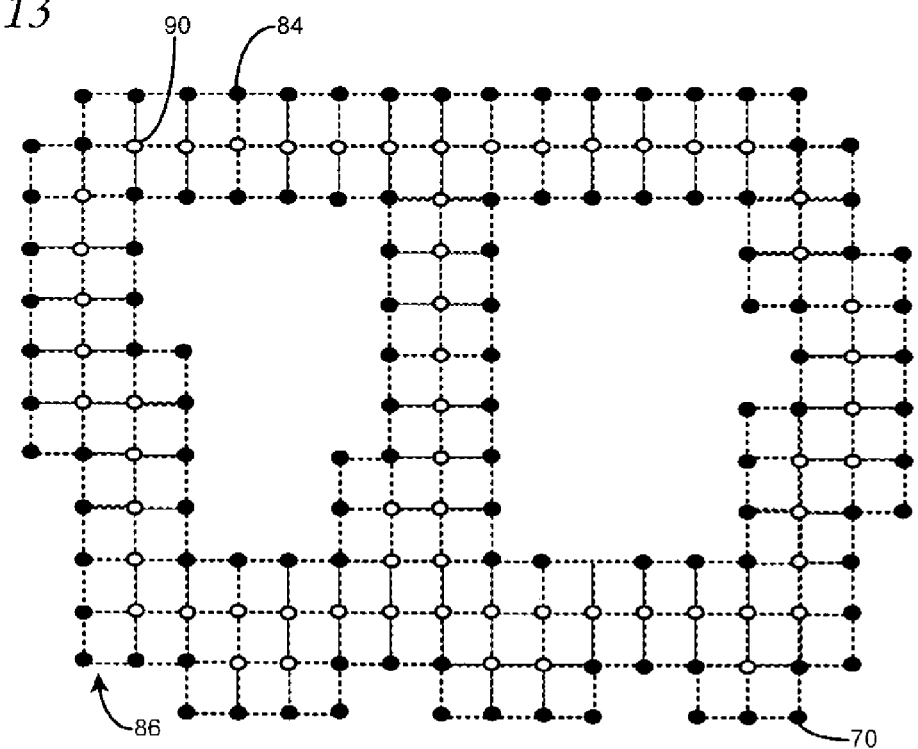
FIG. 13 is the second exemplary polygon including polygon vertices.
Figure 15:
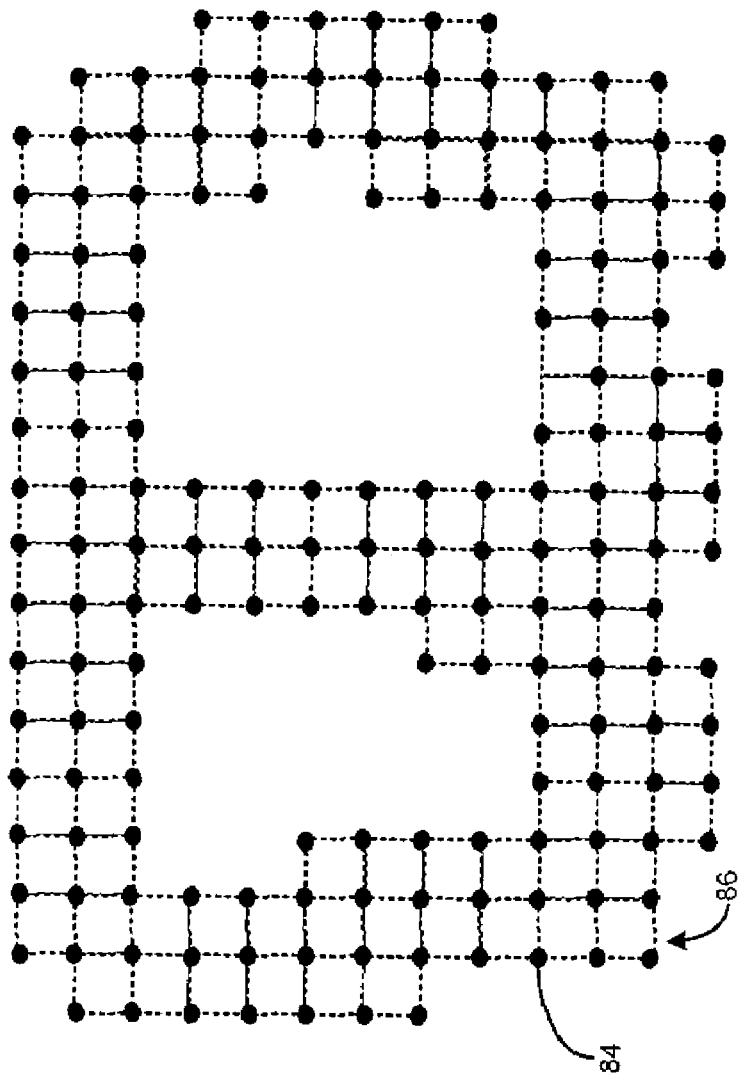
FIG. 15 is a representation of the second polygon with the interior polygon vertices removed.
Figure 14:
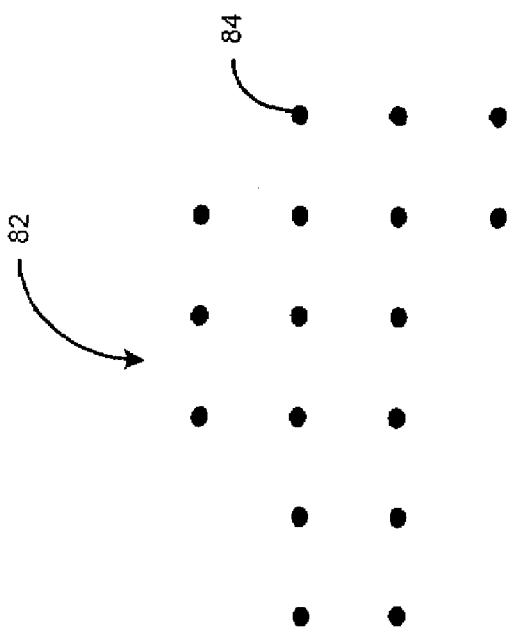
FIG. 14 a representation of the first polygon with interior polygon vertices removed.

Next, according to a step 222, interior polygon vertices are removed. More particularly, an interior polygon vertex is understood to refer to those polygon vertices that are internal to the polygon and do not define a border of the same. According to one embodiment, this determination is made by querying for the existence of neighboring polygon vertices in all directions. For example, as shown in FIG. 11, a first interior polygon vertex 89 has eight neighboring polygon vertices 90a-90h. In other words, the first interior polygon vertex 89 is surrounded and enclosed by the neighboring polygon vertices 90a-90h. Similarly, as shown in FIG. 13, second internal polygon vertices 90 of the second exemplary polygon 86, are removed. As will be recognized from the illustration, each of the second interior polygon vertices 90 have, as indicated above, neighboring polygon vertices in all directions. FIGS. 14 and 15 show the first and second exemplary polygons 82, 86, respectively, after removing the interior polygon vertices as set forth above.

It is understood that the first and second polygons 82, 86, respectively, are stored as lists of coordinates corresponding to the polygon vertices 84 thereof, but in no particular order. In other words, the proper outline of boundaries has not yet been determined. With reference to the flowchart of FIG. 5b, the method continues with a step 224 of deriving boundaries from the polygon vertices 84 by storing in a trace list at least a subset the polygon vertices. This process is otherwise referred to as "tracing" a boundary.

Figure 17:
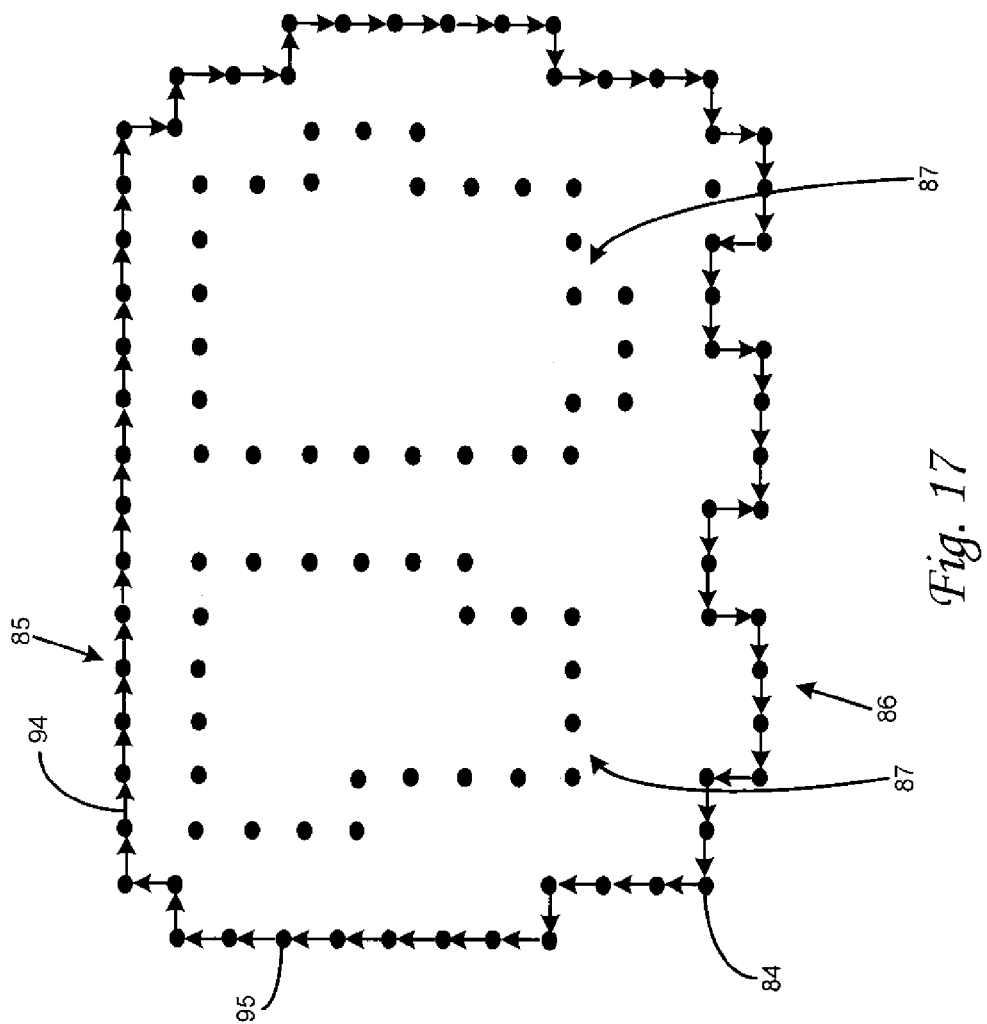
FIG. 17 illustrates an outer boundary of the second polygon being derived from the polygon vertices thereof.
Figure 16:
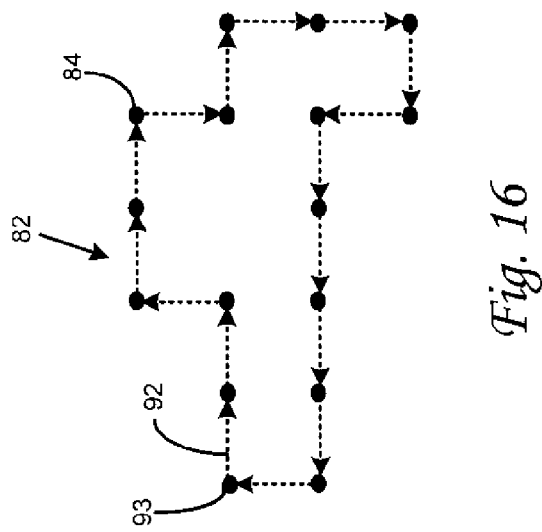
FIG. 16 illustrates an outer boundary of the first polygon being derived from the polygon vertices thereof.

It is understood that the outer boundary is derived for polygons with a solid interior as well as for polygons with a hollow interior. In this regard, the process of deriving the outer boundary involves storing the polygon vertices 84 in an outer trace list. Where the polygon has a solid interior, all of the polygon vertices 84 are traced to derive the outer boundary. In the example shown in FIG. 16, a first outer boundary 92 of the first exemplary polygon 82 is derived beginning with a starting vertex 93. Each of the polygon vertices 84 is traversed in a clockwise direction and the coordinates thereof are stored in the outer trace list until reaching the starting vertex 93. However, where the polygon has a hollow interior, as shown in the example of FIG. 17, a first subset 85 of all of the polygon vertices 84 are traced to derive a second outer boundary 94 of the second exemplary polygon 86, with a second subset 87 of the polygon vertices 84 being traced to derive the inner boundaries. The process begins with a starting vertex 95. The first subset 85 of the polygon vertices 84 are traversed in a clockwise direction, and the coordinates thereof are stored in the outer trace list until reaching the starting vertex 95.

Figure 18A:
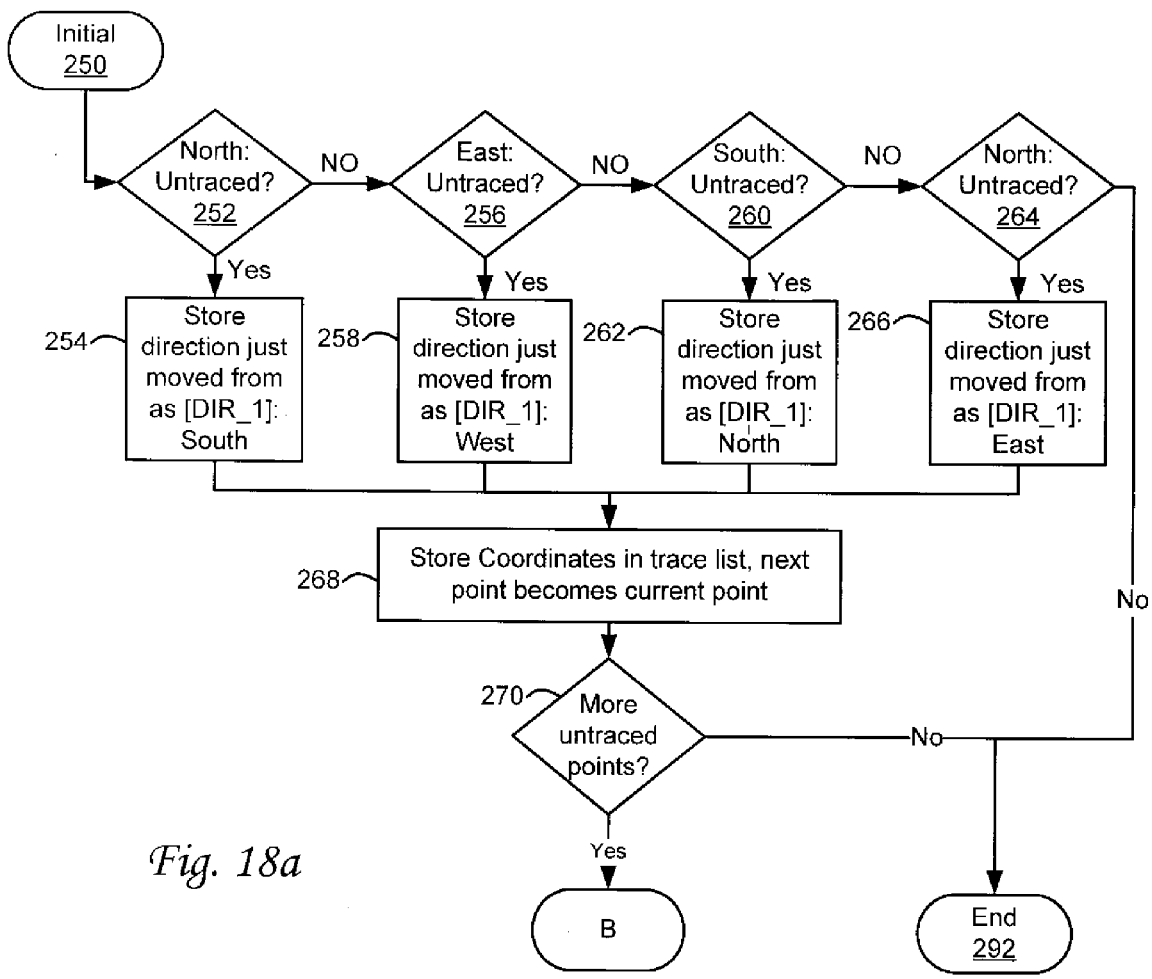
FIG. 18a is a first section of a flowchart illustrating the procedure of tracing each of the polygon vertices to derive the outer boundary of the first and second polygons.
Figures 18B, 18C:
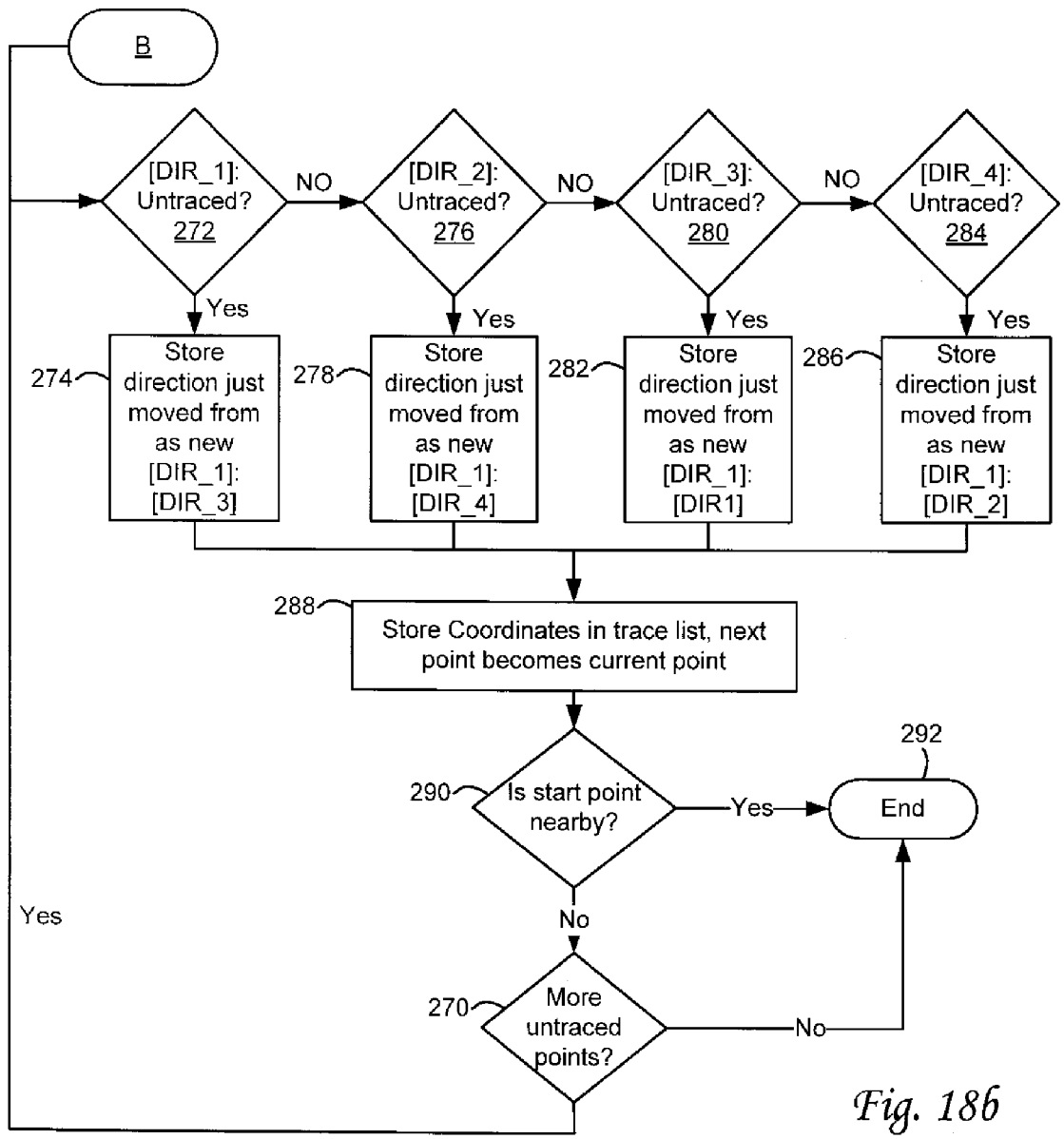
FIG. 18b is second section of a flowchart illustrating the procedure of tracing each of the polygon vertices in accordance with an aspect of the present invention.
FIG. 18c is a table containing the order in which the polygon vertices are traced.

With reference to the flowchart of FIG. 18*a* and the trace order list of FIG. 18*c*, the process of tracing the polygon vertices 84 begins with an initial state 250, and utilizes a first variable that stores the direction from which the current polygon vertex was traced and a second variable that stores the current polygon vertex from which further tracing is conducted. In a first static decision branch 252, it is determined whether there is an untraced polygon vertex in the northward direction. If there is, the first variable is assigned a value of south, per storage step 254. Otherwise, it is next determined whether there is an untraced polygon vertex in the eastward direction per a second static decision branch 256. If there is an untraced polygon vertex in the eastward direction, the first variable is assigned a value of west according to a second storage step 258. If not, the process continues with a third static decision branch 260. Here, it is determined whether there is an untraced polygon vertex in the southward direction. If there is, the first variable is assigned a value of north in storage step 262. If not, it is then determined whether there is an untraced polygon vertex in the westward direction according to a fourth static decision branch 264. The first variable is assigned a value of east per fourth storage step 266, if the fourth static decision branch 264 determined that the westward direction had an untraced polygon vertex. If not, the process ends 292. After executing one of the first, second, third, and fourth storage operations 254, 258, 262, and 266, the coordinates in the second variable are stored in the trace list according to step 268.

With reference to FIG. 18*b*, if there are additional untraced points at a decision branch 270, the method continues into a dynamic part in which the order of directions to attempt to trace changes depending on direction from which the current polygon vertex was scanned. Otherwise, the process ends 292. The value stored in the first variable is used to correlate to a one of the starting rows 300*a*-*d* in the trace order list of FIG. 18*b*. As utilized herein, the term specified row refers to the one of the starting rows 300*a*-*d* correlated to the direction value in the first variable. In a first dynamic decision branch 272, the direction in the first column DIR_1 of the specified row is examined to determine whether there is an untraced polygon vertex. If there is, the direction in the third column DIR_3 of the specified row is stored in the first variable according to a storage step 274. Otherwise, per a second dynamic decision branch 276, the direction in the second column DIR_2 of the specified row is examined for an untraced polygon vertex. If the decision yields a true result, then the first variable is re-written with the direction in the fourth column DIR_4 of the specified row per storage step 278. If the decision yields a false result, then the direction in the third column DIR_3 is checked for an untraced polygon vertex according to a third dynamic decision branch 280. If there is one, then per storage step 282, the first variable is re-written with the direction in the first column DIR_1 of the specified row. If not, then according to a fourth dynamic decision branch 284 the direction in the fourth column DIR_4 is examined for an untraced polygon. If there is, the first variable is re-written with the direction in the second column DIR_2. Otherwise, the process ends 292. Next, per step 288, the coordinates stored in the second variable are transferred to the trace list, and incremented to the coordinates of the discovered untraced polygon vertex. Before continuing on to the next iteration, per decision branch 290, it is determined whether the starting point is nearby. If not, the process returns to the decision branch 270. If there is, the process ends 292.

Figure 19:
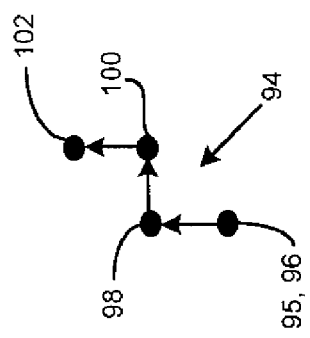
FIG. 19 is a series of example polygon vertices for illustrating the processes of tracing the boundary of the same in accordance with an aspect of the present invention.

With reference to FIG. 19, an example iteration of the foregoing tracing process will be described. There is a first polygon vertex 96, also the starting point 95, and to the north thereof, a second polygon vertex 98. To the west of the polygon vertex 98 is a third polygon vertex 100, and to the north of that is a fourth polygon vertex 102. Beginning with the initial state 250, the process determines whether there is an untraced vertex to the north per the first static decision branch 252. Since a positive determination is made, the first variable is stored with the direction south as per storage step 254. Thereafter, the coordinates of the first polygon vertex 96 are stored in the trace list per step 268, and the second variable is re-written with the coordinates of the discovered second polygon vertex 98.

Since there are more untraced points per decision branch 270, the process continues into the first dynamic decision branch 272. As indicated above, the one of the starting rows 300*a*-*d* are correlated to the direction value stored in the first variable, which is south. Thus, row 300*a* in which DIR_1 is south, DIR_2 is west, DIR_3 is north, and DIR_4 is east, is the specified row. The process continues through each of the first, second and third dynamic decision branches 272, 276, 280, and generates a true result at the fourth dynamic decision branch 284, as the third polygon vertex 100 is to the east. Next, per step 286, the first variable is rewritten with DIR_2, which is west. According to step 288, the coordinates of the second polygon vertex, as stored in the second variable, is written to the trace list. Further, the newly discovered fourth polygon vertex 102 is written to the second variable. Because the starting point is not nearby according to a response from the decision branch 290, the process returns to the decision branch 270.

There are further additional points to be processed per decision branch 270, so the process continues with the first dynamic decision branch 272. As mentioned above, the first variable has a value of west, and so row 300*b* in which DIR_1 is west, DIR_2 is north, DIR_3 is east, and DIR_4 is south is the specified row. The process continues through the first dynamic decision branch 272 because there is no untraced polygon vertex to the west. However, upon reaching the second dynamic decision branch, the fourth polygon vertex 102, which is north of the third polygon vertex 100, is discovered. The first variable is rewritten with south, because the direction in column DIR_4 and row 300*b* is south. The coordinates of the third polygon vertex 100 is written, and the second variable is incremented to the coordinates of the fourth polygon vertex 102, according to step 288. Upon returning to decision branch 270, because there are no further polygon vertices to be processed, the end 292 is reached.

As can be seen, the above-described tracing of the outer boundary 94 proceeds in a generally clockwise direction. It will be understood by those of ordinary skill in the art that a counter-clockwise direction may be readily substituted by changing the order of the first, second, third, and fourth decision branches 232, 234, 236, and 238.

The step 224 of tracing the boundary is also understood to encompass the processing of inner boundaries. Where the aforementioned flag is set, indicating that the polygon to which it pertains is hollow, the deriving of the inner boundaries begins. As indicated above, the inner boundaries are derived from a second subset of the polygon vertices 84.

Where multiple sections of inner boundaries exist, multiple groups of the aforementioned second subset of the polygon vertices 84 are processed.

As explained above, the process of deriving the outer boundary 94 of the second polygon 86 concludes upon returning to the starting point 95. With reference to the example of FIG. 20, deriving a first inner boundary 104 begins with identifying the polygon vertices 84 of both the first subset 85 (relating to the outer boundary 94) and the second subset 87 (relating to the first inner boundary 104) that define the shortest distance between the two. More particularly, each of the polygon vertices 84 in the first subset 85 are traversed, calculating the distance to the nearest untraced polygon vertex of the first group 87*a* of second subset 87. In the example, these points are identified as a first outer cavity junction point 106, and a first inner cavity junction point 108, which are stored for future reference. For efficiency purposes, where a distance of less than two grid-lengths, or standard distances between two of the polygon vertices 84, has been encountered during the traversal of the polygon vertices 84 in the first subset 85, no others are traversed.

Upon the identification of the first inner cavity junction point 108, each of the polygon vertices 84 associated with the first group 87*a* of the second subset 87 is traced to derive the first inner boundary 104. This process is almost identical to that described above in relation to identifying the second outer boundary 94, except the coordinates of the traced polygon vertices 84 are stored in an inner trace list, and the trace proceeds in a counter-clockwise direction, as opposed to a clockwise direction as described above in relation to tracing an outer boundary, to ensure that the cavity 88 is not filled.

In order to derive a second inner boundary 105, the remaining polygon vertices 84 of the first subset (relating to the outer boundary 94) and the second subset 87 of the polygon vertices 84 that define the shortest distance between the two is identified. The remaining polygon vertices 84 in the first subset 85 are traversed as above, with the distance to the nearest untraced polygon vertex of the second group 87*b* of the second subset 87 being calculated. In the example, a second outer cavity junction point 110 and a second inner cavity junction point 112 are identified. As described above, each of the polygon vertices 84 in the second group 87*b* of the second subset 87 are traced in a counter-clockwise direction, the coordinates thereof being stored in the inner trace list. The coordinates of the second outer and inner cavity Junction points 110, 112 are stored for later reference.

Figure 20:
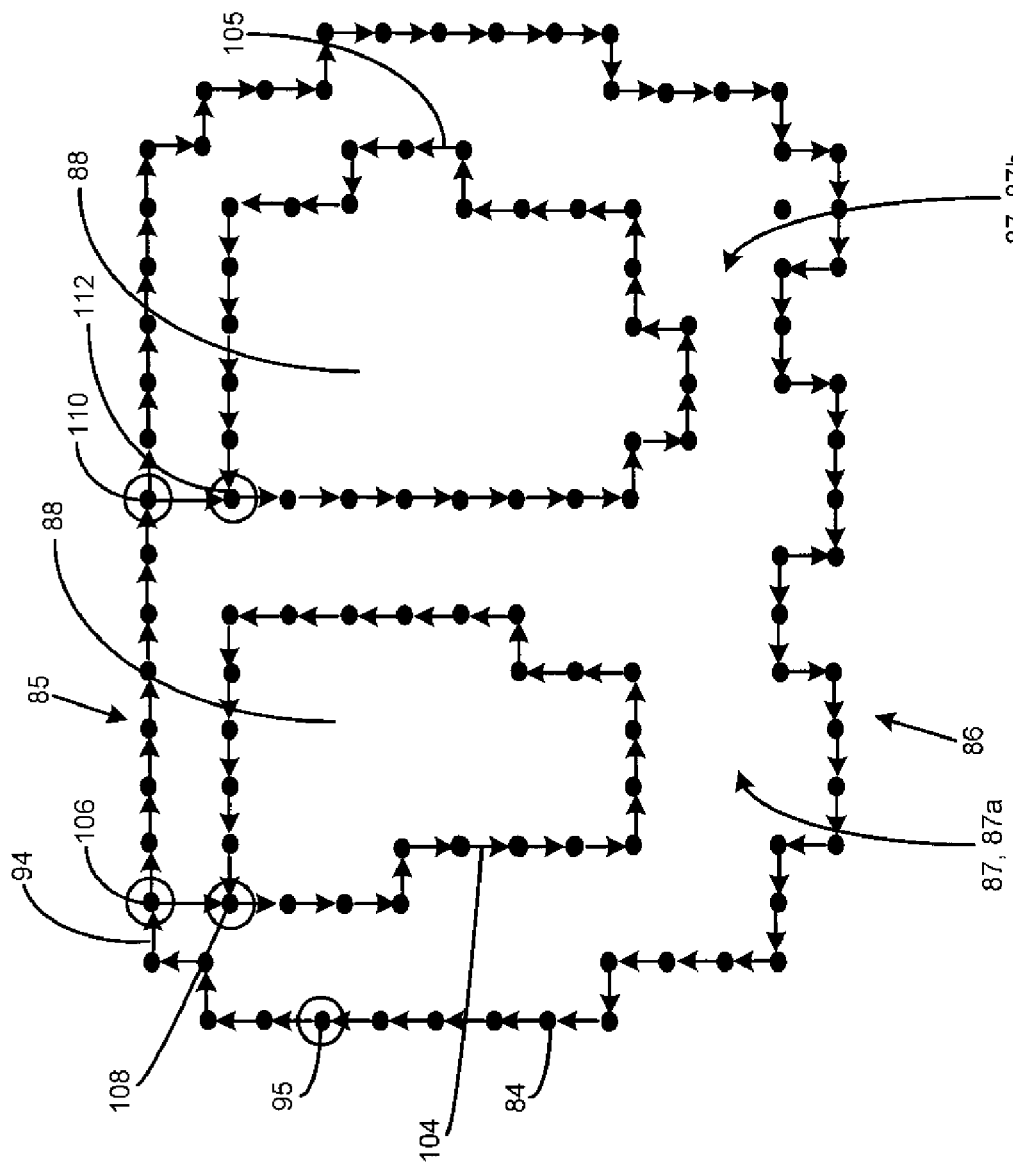
FIG. 20 is a diagram of the second polygon that illustrates the process of inner boundaries being traced, and its relation to tracing the outer boundary.
Figure 21:
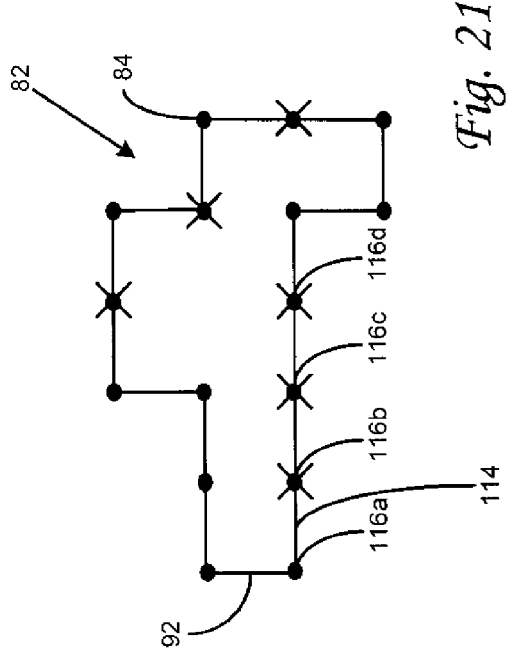
FIG. 21 depicts the removal of intermediate polygon vertices from the first polygon in accordance with an aspect of the present invention.

With reference back to the flowchart of FIG. 5*b*, per step 226, the intermediate polygon vertices are removed. As understood, an intermediate polygon vertex is any polygon vertex lying within a single contiguous line segment that defines a boundary of the polygon. For example, as shown in FIG. 21, a continuous line segment 114 defines the first outer boundary 92 of the first exemplary polygon 82, and includes segment polygon vertices 116*a*, 116*b*, 116*c*, and 116*d*. The beginning of the continuous line segment 114 is defined by the segment polygon vertex 116*a*, while the ending is defined by the segment polygon vertex 116*d*. It will be appreciated that the intermediate polygon vertices, the segment polygon vertices 116*b* and 116*c*, do not contribute to the shape of the polygon 82, and slows down the processing of any annotations generated therefrom. Accordingly, the segment polygon vertices 116*b* and 116*c* are removed, as are the other polygon vertices 84 that have similar characteristics as described above. Referring to FIG. 20, it will be appreciated that regardless of the first and second outer cavity junction points 106, 110 being intermediate polygon vertices, these are not removed as such points are needed for properly defining and connecting the second polygon 86 to the cavities 88. It will also be appreciated that if the first and second inner cavity junction points 108, 112 are intermediate polygon vertices, these will not be removed for the same reason.

Figure 23:
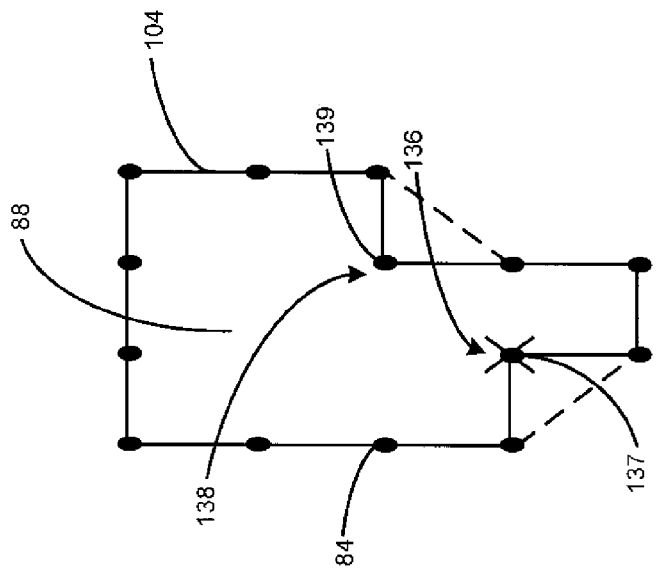
FIG. 23 depicts the removal of central vertices of outward polygon corners from the second polygon.
Figure 22:
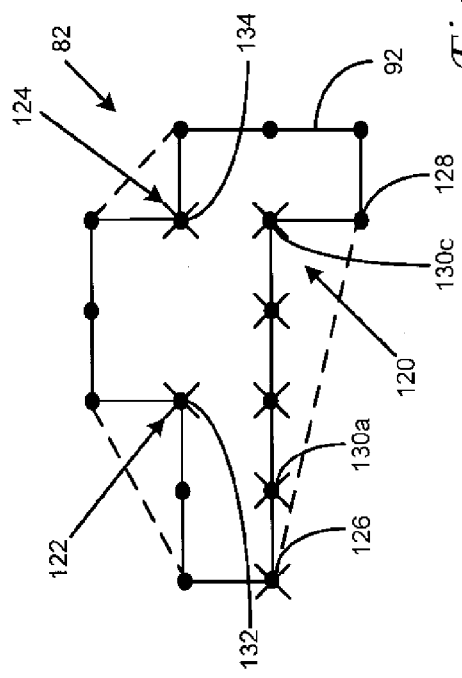
FIG. 22 depicts the removal of central vertices of inward polygon corners from the first polygon.

After removing the intermediate polygon vertices, central vertices of polygon corners are removed for smoothing the same such that corresponding annotations cover a sufficient area. For the outer boundaries, the inner corners are removed, while for inner boundaries, outer corners are removed. Unless otherwise noted, the usage of the term "corner" is understood to refer to both outer corners and inner corners. FIG. 22 shows the first exemplary polygon 82 including a first inner corner 120, a second inner corner 122, and a third inner corner 124. As generally understood, inner corners refer to those portions of the first polygon 82 that are concave with respect to the exterior thereof. The central vertices of polygon corners are determined by examining the direction of adjoining polygon vertices 84, and retrieving the remaining polygon vertices 84 to determine whether others exist on a straight line in the opposite direction from the adjoining polygon vertices 84. Returning to the example of FIG. 22, the first inner corner 120 is defined by a beginning vertex 126, an ending vertex 128, and central vertices 130*a*, 130*b*, and 130*c*. By removing the central vertices 130*a-c*, the outer boundary 92 extends directly from the beginning vertex 126 to the ending vertex 128. Along these lines, a central vertex 132 of the second inner corner is removed, as is a central vertex 134 of the third inner corner 134. FIG. 23 shows the first inner boundary 104 of the second exemplary polygon 86 defining the cavity 88. There is a first outer corner 136 defined by a first central vertex 137 and a second outer corner 138 defined by a second central vertex 139. Both first and second central vertices 137, 139 are identified and removed in the same manner as described above. It will be appreciated that the coverage of the annotation is increased by removing the central vertices 137, 139.

Referring to FIG. 5*b*, the process of generating the annotation concludes with a step 229 of assigning the values of the polygon vertices defining the outer boundaries and the inner boundaries, as applicable to the vertices that define the visual appearance of the annotation. In the particular example of the second polygon 86, it is understood that the first outer and inner cavity junction points 106,108 and the second outer and inner cavity junction points 110, 112 serve to connect the inner boundaries 104, 105 to the outer boundary 94. As understood, annotations may have a variety of parameters that affect the visual appearance thereof upon rendering, which may applied to the annotation during generation. By way of example only and not of limitation, the annotation may be assigned a subject, a line and fill color, opacity, line stylization, locking parameters, and so forth.

Figure 24:
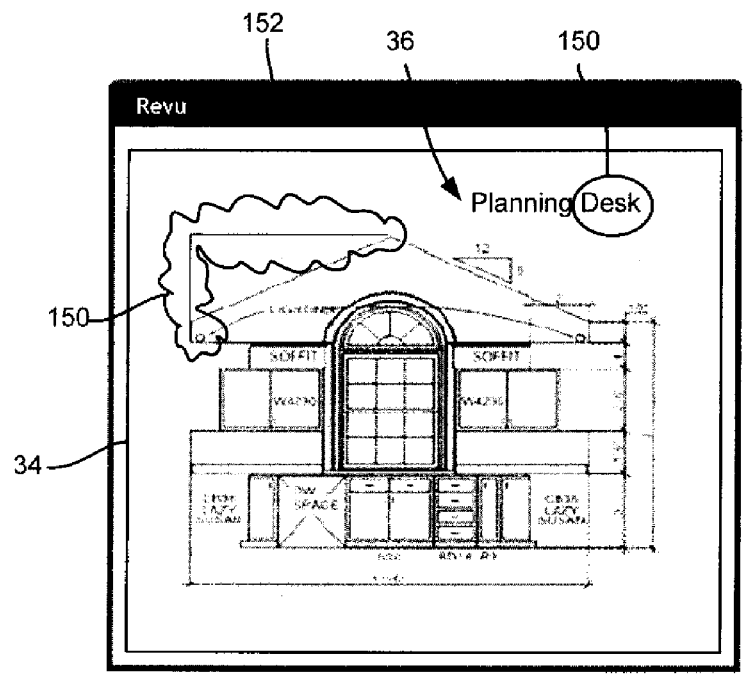
FIG. 24 is a screen capture of a graphical user interface that is displaying the modified document with annotations overlaid thereon.
Figure 25:
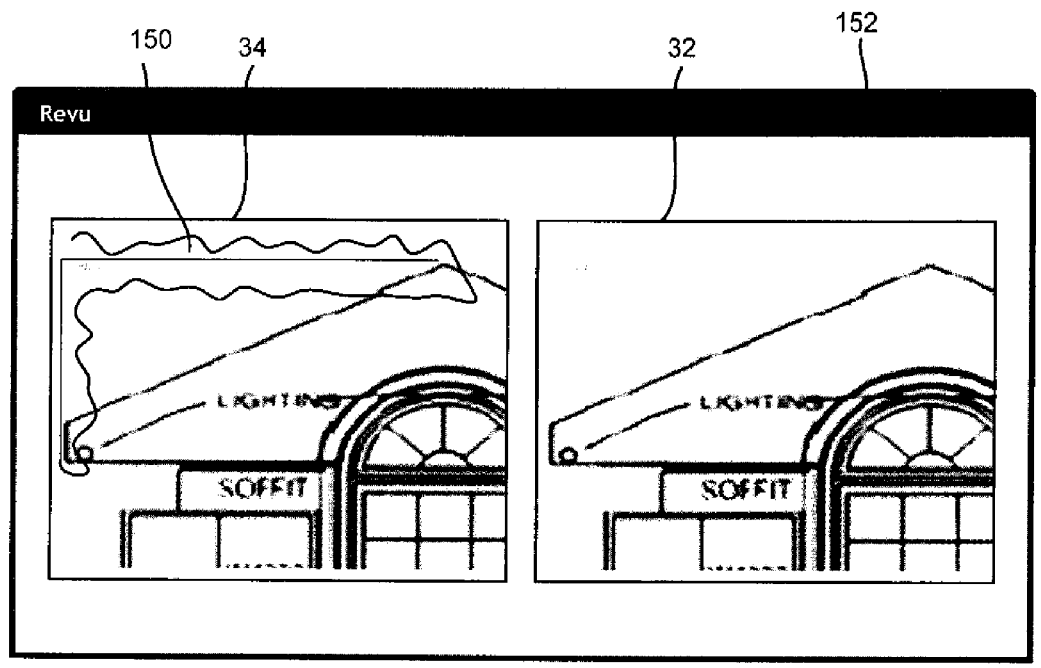
FIG. 25 is a screen capture of the graphical user interface where the modified document including the annotations is displayed simultaneously with the original document.

According to another aspect of the present invention illustrated in FIGS. 24 and 25, there are provided various ways of presenting the annotations to the user for rapid identification of differences. For example, in FIG. 24, the annotations 150 are overlaid in the modified document 34, which is displayed in a conventional graphical user interface 152. In another example as shown in FIG. 25, the annotations 150 are overlaid on the modified document 34, with the modified document and the original document 32 being displayed simultaneously in the graphical user interface 152. Further, it is contemplated that the view of the modified document 34 and the original document 32 is synchronized, that is, when one of the modified or original documents 32, 34 is magnified or panned as shown in the example of FIG. 25, the other document magnifies and pans to the same extent. Other user interface enhancements known in the art may be readily substituted without departing from the scope of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show any more detail than is necessary for the fundamental understanding of the present invention, the description taken with the drawings making apparent to those skilled in the art how the several forms of the present invention may be embodied in practice.

What is claimed is:

1. A method for emphasizing differences in graphical appearances between an original document and a modified document with attached annotations, the method comprising:
   receiving a first bitmap of the modified document and a second bitmap of the original document;
   deriving a set of difference points based upon a comparison of the first bitmap and the second bitmap, the difference points being representative of coordinates within the first and second bitmaps having pixel value differences exceeding a predetermined threshold;
   superposing a spatial index on to the set of difference points, the spatial index being defined by contiguously spaced cells bound by cell vertices;
   generating polygon vertices from selected cell vertices, the selected cell vertices corresponding to first cells having a density of difference points contained therein greater than a predetermined threshold and the first cells adjacent to second cells having density of difference points contained therein greater than a predetermined threshold; and
   generating from the polygon vertices an annotation defined by annotation vertices.

2. The method of claim 1, wherein the step of generating the annotation further includes:
   deriving an outer boundary from a first subset of the polygon vertices; and
   assigning the polygon vertices defining the outer boundary to the annotation vertices.

3. The method of claim 2, wherein after generating the polygon vertices, the method further includes:
   removing interior polygon vertices, the interior polygon vertices being located within the outer boundary and surrounded by neighboring polygon vertices.

4. The method of claim 2, wherein deriving the outer boundary from the first subset of the polygon vertices includes:
   sequentially storing in an outer trace list each of the first subset of the polygon vertices around the outer boundary from an outer starting point in a first generally rotational direction, the polygon vertices in the outer trace list being associated with a first portion of the annotation vertices.

5. The method of claim 2, further comprising:
   removing each of the polygon vertices lying within a single contiguous line segment defining the outer boundary; and
   removing central vertices of polygon corners.

6. The method of claim 2, wherein the step of generating the annotation further includes:
   deriving one or more inner boundaries from one or more groups of a second subset of the polygon vertices; and
   assigning the polygon vertices defining the one or more inner boundaries to the annotation vertices.

7. The method of claim 6, wherein after generating the polygon vertices, the method further includes:
   removing interior polygon vertices, the interior polygon vertices located within the outer boundary and the inner boundary and surrounded by neighboring polygon vertices.

8. The method of claim 6, wherein deriving the inner boundary from one or more groups of the second subset of the polygon vertices includes:
   sequentially storing in an inner trace list a first one of the groups of the second subset of the polygon vertices around a first one of the inner boundaries from a first inner starting point in a second generally rotational direction, the polygon vertices in the inner trace list being associated with a second portion of the annotation vertices.

9. The method of claim 8, wherein deriving the inner boundary from one of the groups of the second subset of the polygon vertices includes:
   sequentially storing in the inner trace list a second one of the groups of the second subset of the polygon vertices around a second one of the inner boundaries from a second inner starting point in the second generally rotational direction.

10. The method of claim 6, further comprising:
    removing each of the polygon vertices lying within a single contiguous line segment defining a one of the outer boundary and the inner boundary; and
    removing central vertices of polygon corners.

11. The method of claim 1, wherein the pixel value differences relate to red, green, and blue luminance values.

12. The method of claim 1, wherein the difference points are representative of coordinates within the first and second bitmaps having neighboring pixel value differences exceeding a predetermined threshold.

13. The method of claim 1, further comprising:
    converting the modified document to the first bitmap representative of the modified document and the original document to a second bitmap representative of the original document.

14. The method of claim 1, further comprising:
    overlaying the annotation on the modified document, the modified document being displayed in a graphical user interface.

15. The method of claim 1, further comprising:
    overlaying the annotation on the modified document, the modified document and the original document being displayed simultaneously in a graphical user interface.

16. The method of claim 1, wherein:
    one or more of the cells defining the spatial index include distinct subsets of the difference points.

17. A method for emphasizing differences in graphical appearances between an original document and a modified document with attached annotations, the method comprising:
    receiving a first bitmap of the modified document and a second bitmap of the original document;
    deriving a set of difference points based upon a comparison of the first bitmap and the second bitmap, the difference points being representative of coordinates within the first and second bitmaps having pixel value differences exceeding a predetermined threshold;
    superposing a spatial index on to the set of difference points, the spatial index being defined by contiguously spaced cells bound by cell vertices, one or more of the cells including distinct subsets of the difference points;
    generating polygon vertices from selected cell vertices, the selected cell vertices corresponding to first cells having a density of difference points contained therein greater than a predetermined threshold and the first cells adjacent to second cells having density of difference points contained therein greater than a predetermined threshold; generating from the polygon vertices an annotation defined by annotation vertices.

* * * * *